United States Patent
Schmitt

[11] Patent Number: 6,027,823
[45] Date of Patent: *Feb. 22, 2000

[54] MOLDED ARTICLE OF METAL MATRIX COMPOSITE, AND METHOD FOR MAKING SUCH AN ARTICLE

[75] Inventor: Theodore Nicolas Schmitt, Vienna, Austria

[73] Assignee: Electrovac, Fabrikation elektrotechnischer Specialartikel Ges. m.b.H., Klosterneuburg, Australia

[*] Notice: This patent issued on a continued prosecution application filed under 37 CFR 1.53(d), and is subject to the twenty year patent term provisions of 35 U.S.C. 154(a)(2).

[21] Appl. No.: 08/677,690

[22] Filed: Jul. 8, 1996

[30] Foreign Application Priority Data

Jul. 7, 1995 [AT] Austria ............................ 1161/95

[51] Int. Cl.[7] ........................... B21D 39/00; B32B 15/04; C03C 27/02

[52] U.S. Cl. ........................... 428/621; 428/627; 428/632

[58] Field of Search ............................ 428/47, 48, 49, 428/539.5, 545, 621, 627, 632; 164/108, 109, 110, 112

[56] References Cited

U.S. PATENT DOCUMENTS

| | | | |
|---|---|---|---|
| 3,214,249 | 10/1965 | Bean et al. | 29/180 |
| 3,970,136 | 7/1976 | Cannell et al. | 164/108 |
| 4,822,660 | 4/1989 | Lipp | 428/113 |
| 4,875,616 | 10/1989 | Nixdorf | 228/120 |
| 5,230,924 | 7/1993 | Li | 427/229 |
| 5,234,045 | 8/1993 | Cisko | 164/97 |
| 5,308,422 | 5/1994 | Askay et al. | 156/89 |
| 5,337,803 | 8/1994 | Divecha et al. | 164/98 |
| 5,620,804 | 4/1997 | Kennedy et al. | 428/609 |

FOREIGN PATENT DOCUMENTS

| | | |
|---|---|---|
| 0 317 129 A1 | 5/1989 | European Pat. Off. . |
| 0368791 | 5/1990 | European Pat. Off. . |

*Primary Examiner*—Paul Thibodeau
*Assistant Examiner*—Holly C Rickman
*Attorney, Agent, or Firm*—Henry M. Freiereisen

[57] ABSTRACT

A molded article of metal matrix composite (MMC) includes a preform infiltrated in a casting process with metal or metal alloy, with the preform comprised of a plurality of spaced preform plates arranged in mosaic disposition in at least one plane, or stacked in several planes above one another, and formed with bores. The spacing between neighboring preform plates and the spacing between overlying planes of preform plates are filled with infiltration metal or metal alloy, without permeation of infiltration metal into the bores.

9 Claims, 5 Drawing Sheets

MOLDED ARTICLE OF METAL MATRIX COMPOSITE, AND METHOD FOR MAKING SUCH AN ARTICLE

BACKGROUND OF THE INVENTION

The present invention refers to a molded article of metal matrix composite (MMC), and in particular to a molded article which is infiltrated with a metal or a metal alloy in a casting process.

Molded articles exhibiting properties resembling those of molded MMC articles are conventionally made through a "tape casting" process, whereby a ceramic casting slip is being poured onto a flat substrate. Subsequently, the top surface is smoothened by suitable devices to create a flat, continuous band which is then consolidated through a drying and sintering process. Also an injection molding process may be used to make such a molded article.

A drawback inherent in both processes is the necessity to use as initial material very fine powder and a large amount of binder, rendering both processes rather expensive.

Molded articles may also be made by compression molding ceramic material or like material by means of a press that generates a specific maximum pressing force. However, the pressure exerted by the press on the molded article depends on the surface thereof. Therefore, a same pressing force exerted by the press on a molded article of small surface results in an application of a high pressure while an application on a molded article of greater surface results in an impact of a lower pressure. Thus, greater molded articles exhibit smaller ceramic volume contents than smaller molder articles. As a consequence, there is no possibility to utilize one machine for making differently sized molded articles with same ceramic volumetric content.

SUMMARY OF THE INVENTION

It is an object of the present invention to provide an improved molded article obviating the afore-stated drawbacks.

In particular, it is an object of the present invention to provide an improved molded article which can be made with a ceramic volumetric content that is independent on the size of the molded article.

It is yet another object of the present invention to provide an improved molded article which can be made in a simple manner from a preform.

It is a still another object of the present invention to provide a method for making a molded article.

These objects, and others which will become apparent hereinafter, are attained in accordance with the present invention by providing a preform comprised of a plurality of spaced preform plates arranged in one or more planes in mosaic-like configuration at formation of a spacing between neighboring preform plates and neighboring planes, and formed with bores, and by infiltrating the preform in a casting process with an infiltration material selected from the group consisting of metal and metal alloy for filling the spacing between neighboring preform plates and neighboring planes without permeation of infiltration metal into the bores.

In this manner, a molded article of MMC material can be made in an easy fashion with same properties as a molded article made from one piece.

Preferably, the preform plates are formed by elements of regular geometric basic shapes such as triangles, rectangles, hexagons, octagons or like shapes and arranged in tight formation for covering the plane. Thus, the preform plates can be manufactured of same size in a cost-efficient manner to effect a sufficient covering of the plane. Suitably, the preform plates of overlying planes are positioned in such a manner that the spacing between the preform plates in one plane is offset to the spacing between the preform plates of an overlying or subjacent plane. In this way, the mechanical properties of the molded article are significantly enhanced. In order to enable an automation of placement of the preform plates, the spacing between individual preform plates in one plane is of same size. Also the spacing between the planes should be essentially of same size in order to effect a homogenous structure and improved properties of the molded article. Preferably, the spacing between the preform plates should be less than 2 mm to minimize the impact on the thermal expansion of the overall molded article. More preferred is a spacing between neighboring preform plates and between overlying planes of 0.01 mm to 1 mm, and most preferred is a range between 0.05 mm and 0.5 mm to positively exclude a negative impact on the thermal expansion of the molded article.

According to another embodiment of the present invention, a molded article is made from a preform which is comprised of a plurality of modular preform plates stacked upon one another in tower-like configuration. In this manner, a finished molded article of small size can be created in a simple manner.

According to another feature of the present invention, at least one panel is placed between the preform plates, with the panel being made of a material differing from a material of the preform plates. Thus, the molded article can be transformed into a casing with integrated casing bottom which is made of particular material already in the manufacturing phase. The panel can be made of ceramics such as aluminum oxide, aluminum nitride or the like, or of metals such as copper, aluminum or the like. The inclusion of such materials enhances the heat transfer, and thus is in particular suitable when using the molded article as casing for electric circuits for carrying off dissipated energy.

According to another feature of the present invention, the preform plates arranged in at least one plane are cast together with a body placed thereon to create a molded article of different mechanical, thermal and electrical properties. Suitably, the body is made of metal, e.g. aluminum, copper, molybdenum, nickel-iron alloy or the like, or of ceramics, e.g. silicon carbide, aluminum nitride, aluminum oxide, boron nitride, or the like. These materials exhibit a particularly high mechanical strength.

Preferably, the matrix-metal is formed from iron, nickel, cobalt, aluminum, copper, titanium, magnesium, silver, gold or silicon or alloys thereof. These materials allow a very precise casting process in a reproducible manner.

According to another feature of the present invention, the preform plates may be made of ceramics, e.g. oxides, titanates, nitrides, carbides, borides, silicons or the like or mixture thereof. Ceramics of this type withstand high temperatures during the casting process and exhibit the necessary mechanical strength. Aluminum oxide, aluminum nitride or silicon carbide are preferred ceramics used for the preform plates as they exhibit good heat transfer properties.

Alternatively, the preform plates may also be made of fiber material to minimize the expansion coefficient of the finished molded article.

In accordance with the present invention, a method of making a molded article of metal matrix composite is carried out by placing a plurality of preform plates at a distance from one another in a plane, or stacking the preform plates in several planes above one another, optionally in tower-like configuration, and infiltrating the preform in a casting process with an infiltration material selected from tire group consisting of metal and metal alloy.

A method of this type can be executed in a simple manner and is suitable for making molded articles of any size.

In case the preform should include passages for electric connections, the preform is formed with bores which are filled during infiltration by plugs which are removed after infiltration.

According to another feature of the present invention, the spacing between the preform plates in one plane and the spacing between planes of neighboring preform plates are filled with a ceramic powder, preferable silicon carbide, for reducing the difference of thermal expansion between the metal-filled spacing after infiltration and the preform plates.

In accordance with another feature of the present invention, at least one panel of a composition different from the preform plates is placed between neighboring preform plates when stacked in tower-like formation for manipulating the properties of the molded article, e.g. its heat conductivity, or by incorporation of a local electrical insulation.

According to another variation of the present invention, a body can be placed on the preform plates disposed in one plane to thereby allow in a simple manner a production of a molded article which has a region that is not permeated by infiltration material but only cast around so that the molded article exhibits areas of different mechanical, thermal and electrical properties.

BRIEF DESCRIPTION OF THE DRAWING

The above and other objects, features and advantages of the present invention will now be described in more detail with reference to the accompanying drawing in which.

DETAILED DESCRIPTION OF PREFERRED EMBODIMENTS

Figure 1A:
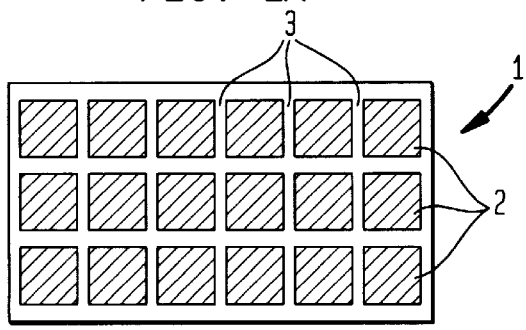
FIGS. 1a to 1d are exemplified plan views of various preforms according to the present invention.

Throughout all the Figures, the same or corresponding elements are generally indicated by the same reference numerals.

Figure 1B:
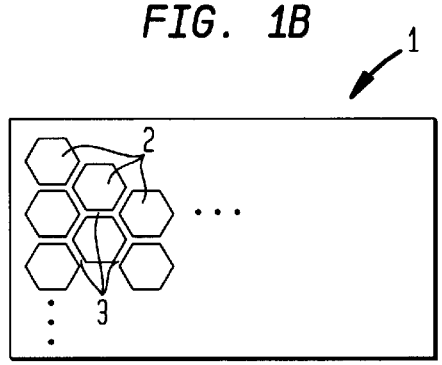
Figure 1C:
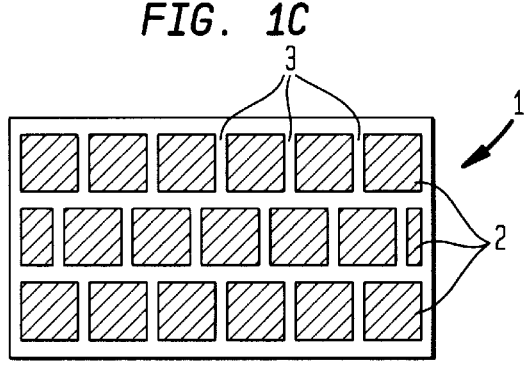
Figure 1D:
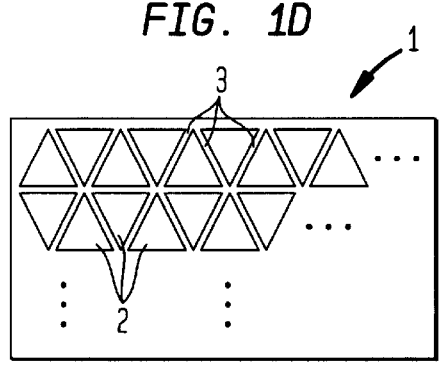

Turning now to the drawing, and in particular to FIGS. 1a to 1d, there are shown exemplified plan views of various preforms according to the present invention, generally designated by reference numeral 1. The preform 1 is comprised of a plurality of preform plates 2 positioned in a mosaic-like fashion in one plane and spaced from one another at a distance 3. The preform plates 2 are formed by regular geometrical basic shapes which are disposed in tight formation to effectively cover the plane. Examples of such basic shapes include squares (FIGS. 1a, 1c), triangles (FIG. 1d) or hexagons (FIG. 1b). Persons skilled in the art will understand that other geometric shapes may certainly also be used, such as octagons, rectangles, trapezoids, rhombus or the like.

Suitably, the spacing 3 between neighboring preform plates 2 is uniform to effect a homogenous structure of the finished molded article. In order to enhance the thermal expansion of the molded article, the spacing 3 between the preform plates 2 is less than 2 mm, preferably between 0.01 mm and 1 mm. Most preferred is a range of the spacing 3 between 0.05 mm and 0.5 mm.

To keep the spacing 3 between the preform plates 2 constant, it may be suitable to scatter a powder of ceramic material between the preform plates 3, or by placing the preform plates 2 in side-by-side disposition and superposed disposition in a preform holder that matches the configuration of the molded article being produced. A very slight spacing is however already effected by the surface roughness of the preform plates 2. The infiltration with metal further results in a "lifting" of the preform plates 2 so as to assume a formation with correct spacing.

Figure 2A:
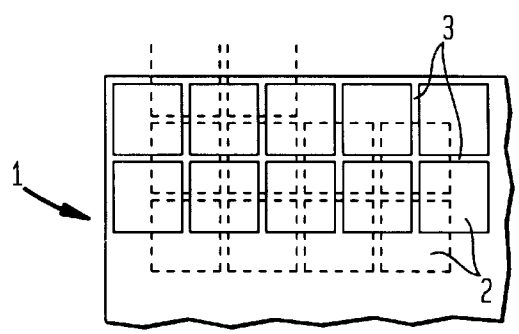
FIGS. 2a and 2b are a fragmentary plan view and a partially sectional view of another embodiment of a preform.
Figure 2B:
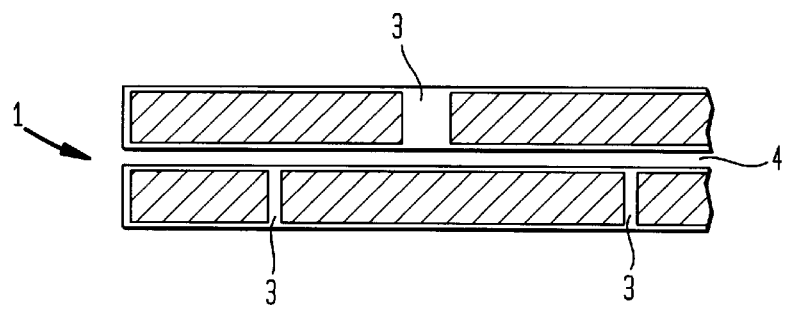

Turning now to FIGS. 2a and 2b, there are shown a fragmentary plan view and a partially sectional view of another embodiment of a preform 1 in form of a plurality of preform plates 2 in side-by-side disposition and stacked above one another in several planes. The spacing 3 between neighboring preform plates 2 and the spacing 4 between superposed planes are filled with infiltration metal or metal alloy. The preform plates 2 are arranged in the overlying planes such that the spacing 3 between the preform plates 2 of one plane is offset to the spacing 3 between the preform plates 2 of an overlying or subjacent plane, as shown in particular in FIG. 2b. Suitably the spacing 4 between overlying planes is also essentially of same size.

Persons skilled in the art will understand that the illustration of two planes of neighboring preform plates 2 in FIGS. 2a and 2b is done by way of example only, and should not be limited thereto. Certainly, any number of superposed planes should be considered within the scope of the present invention.

Figure 3A:
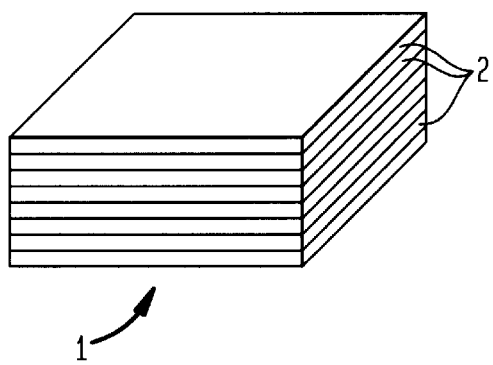
FIG. 3a is a schematic perspective illustration of a preform of tower-like structure in accordance with the present invention.
Figure 3B:
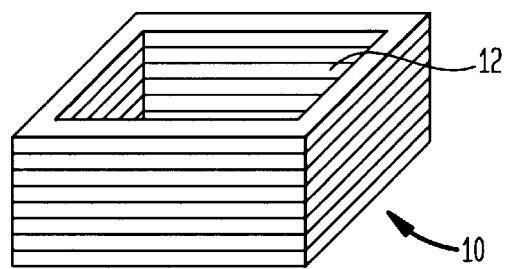
FIG. 3b is a schematic perspective illustration of the preform of FIG. 3a after transformation into a casing.
Figure 3C:
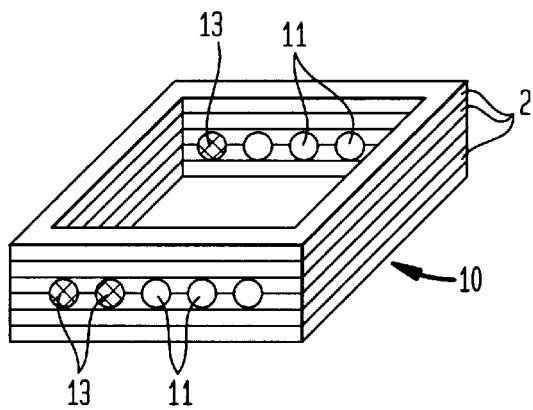
FIG. 3c is a schematic perspective illustration of a variation of a casing made from a tower-like preform.

Turning now to FIG. 3a, there is shown a schematic perspective view of a molded article on the basis of a preform 1 in form of a plurality of preform plates 2 that are stacked in a tower-like fashion. A molded article of this type may then be converted into a casing with one open end, as shown e.g. in FIGS. 3b and 3c and generally designated by reference numeral 10. In FIG. 3b, the casing 10 is formed by extracting a square-shaped section from the preform 1. In FIG. 3c, the casing 10 is formed with passages 11 for effecting electrical connections when the casing 10 is used for accommodating electric or electronic circuits, components or componentries. During infiltration with metal, these passages 11 are closed by plugs 13, e.g. of graphite, which can be drilled out or knocked out after the infiltration step.

Figure 4A:
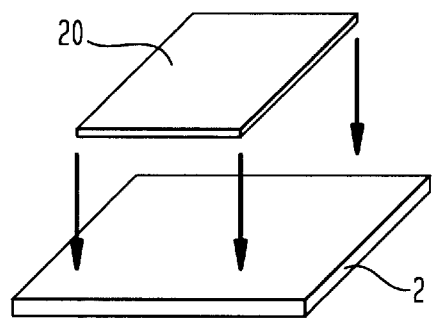
FIGS. 4a to 4c are schematic perspective illustrations of process steps for making a modified preform according to the present invention.
Figure 4B:
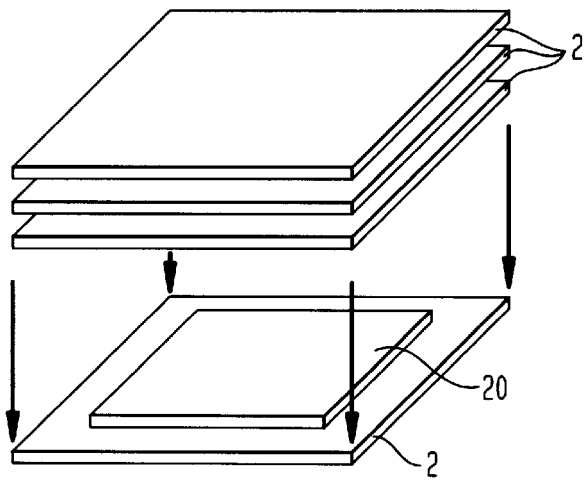
Figure 4C:
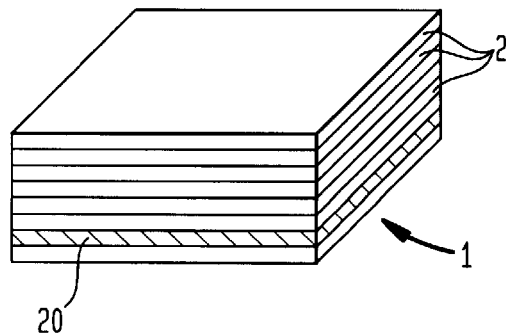

Turning now to FIGS. 4a to 4c, there are shown schematic perspective illustrations of process steps for making a modified molded article according to the present invention, which differs from the previous embodiments by the type of preform 1 which according to FIGS. 4*a* to 4*c* has incorporated therein at least one panel 20 between stacked preform plates 2. The panel 20 is made of a material that differs from the material of the preform plates 2 and is placed between two preform plates 2 during stacking. Even though FIGS. 4*a* and 4*b* show the panel 20 of smaller dimensions compared to the preform plates 2, persons skilled in the art will understand that this is done by way of example only, and certainly the panel may assume any desired dimension.

The preform 1 of stacked preform plates 2 and incorporated panel 20 is then subjected to infiltration by metal.

The panel 20 may be made of ceramics, e.g. aluminum oxide, aluminum nitride or the like, or of metal, e.g. copper, aluminum, or the like. It will be understood that these examples should not be considered exhaustive as other material may certainly also be suitable.

FIG. 4*c* shows a perspective view of the finished molded article which can be used as a casing for electric circuits, with the casing 10 including a metallic panel 20 or a ceramic panel that is coated with a metal layer exposed after the infiltration process to serve as a basis for a printed circuit. The necessary conductive tracks can be applied directly onto this panel 20 so that a separate production and incorporation of a printed circuit board within the casing can be omitted.

Preferably, all preforms 1 according to the present invention are permeated during the infiltration step by a matrix metal based on iron, nickel, cobalt, aluminum, copper, titanium, magnesium, silver, gold or silicon or alloys thereof.

Examples of materials for the preform plates 2 include ceramics, e.g. oxides, titanates, nitrides, carbides, borides, silicons or the like or mixtures thereof, preferably ceramics of aluminum oxide, aluminum nitride or silicon carbide. In certain applications, it may be suitable to make the preform plates 2 of fiber material such as graphite fibers, carbon fibers or ceramic fibers of aluminum oxide, silicates, silicon carbide or the like. In particular when using carbon fibers, MMC articles can be made of very low thermal expansion coefficient.

Figure 5A:
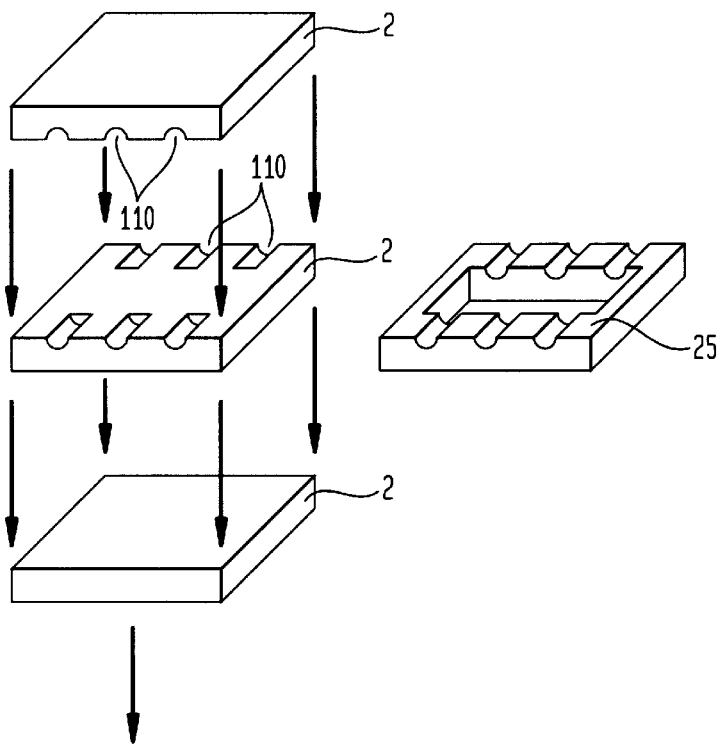
FIGS. 5a to 5c are schematic perspective illustrations of process steps for making a molded article in form of a casing with electrically insulated passages for electric connections.
Figure 5B:
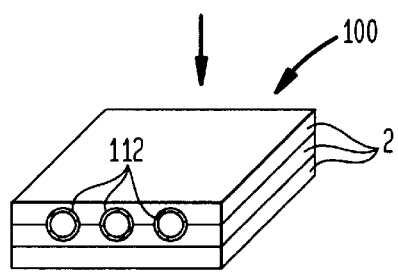
Figure 5C:
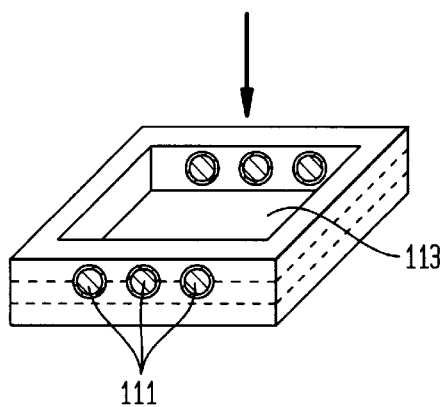

FIGS. 5*a* to 5*c* show schematic perspective illustrations of process steps for making a molded article for use of a casing for electric or electronic components or componentries and formed with electrically insulated passages 111 in the casing wall. The preform plates 2 are formed at suitable locations with recesses 110, e.g. semi-cylindrical grooves, as shown in FIG. 5*a*. Any other shape of the recesses 110 should however be considered within the scope of the present invention, such as e.g. full cylinders, block-shapes etc. These recesses 110 can already be formed during production of the preform plates 2, i.e. during pressing of the preform plates 2 by suitably configuring the surface structure of the pressing tools, or through suitable machining of the preform plates prior to the infiltration step, e.g. by drilling, milling or the like.

After stacking the preform plates 2 upon one another, tubes 112 made of insulating material such as ceramics or the like are placed in the formed passages, as shown in FIG. 5*b*. Subsequently, the preform 1 is infiltrated with metal, whereby the tubes 112 are also filled with metal to thereby form electric conductors which are insulated from the remaining structure by the tubes 112. After infiltration, the structure is converted into a casing by extracting a square or rectangular section to expose an interior space 113, as shown in FIG. 5*c*.

Formation of the interior space 113 may however also be effected prior to infiltration, or, as indicated in FIG. 5*a*, by forming one or more preform plates 2 as suitably shaped frame structures 25 so that the extra step of forming the interior space 113 of the casing is omitted.

Figure 6A:
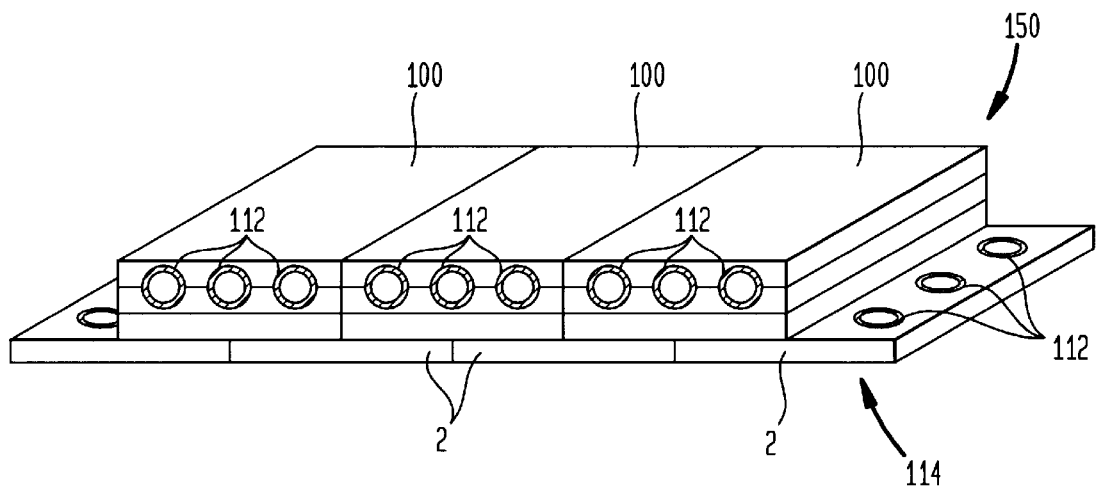
FIGS. 6a and 6b are schematic perspective illustrations of a modification of the molded article according to FIGS. 5a to 5c.
Figure 6B:
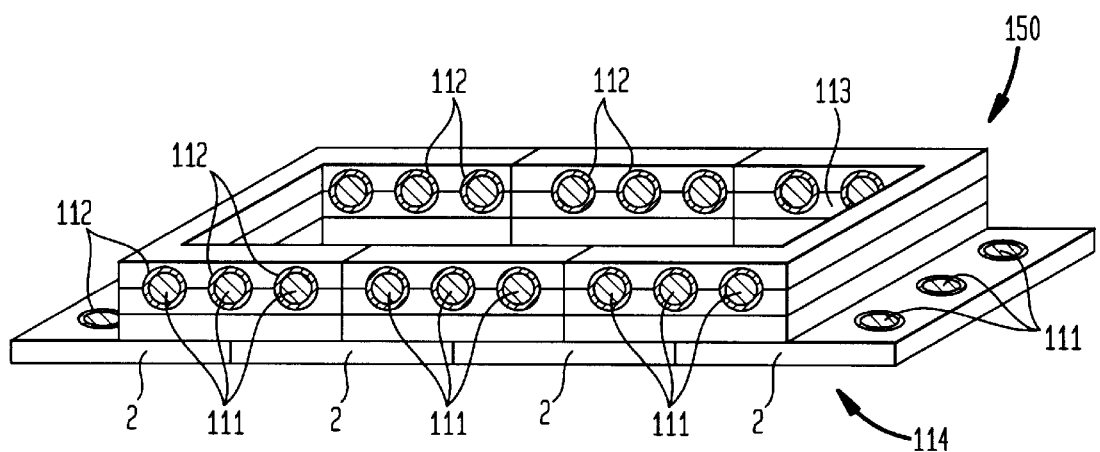

Referring now to FIGS. 6*a* and 6*b*, there are shown perspective views of a preform 150 for making a molded article in form of a casing for accommodation of greater components or componentries. As shown in FIG. 6*a*, the preform 150 includes several modules 100 which are stacked upon one another in tower-like fashion to form three towers in side-by-side disposition on a bottom panel 114 which is comprised of several preform plates 2 in side-by-side disposition.

Persons skilled in the art will understand that the illustration of three towers of modules 100 is done by way of example only and the present invention should not be limited thereto, as any number of stacked and adjoining modular towers and any number of preform plates 2 for making the bottom panel 114 are feasible. It is certainly also within the scope of the present invention to place the single modules 100 not only next to each other but also behind each other to create e.g. a rectangular preform 150, as viewed in plan view.

As further shown in FIGS. 6*a* and 6*b*, the modules 100 and the outermost preform plates 2 are formed with recesses or bores 112 for insertion of ceramic tubes 112 prior to infiltration, with the interior space 113 of the casing being formed before or after infiltration in a manner already described in connection with the casing according to FIGS. 5*a* to 5*c*.

Figure 7A:
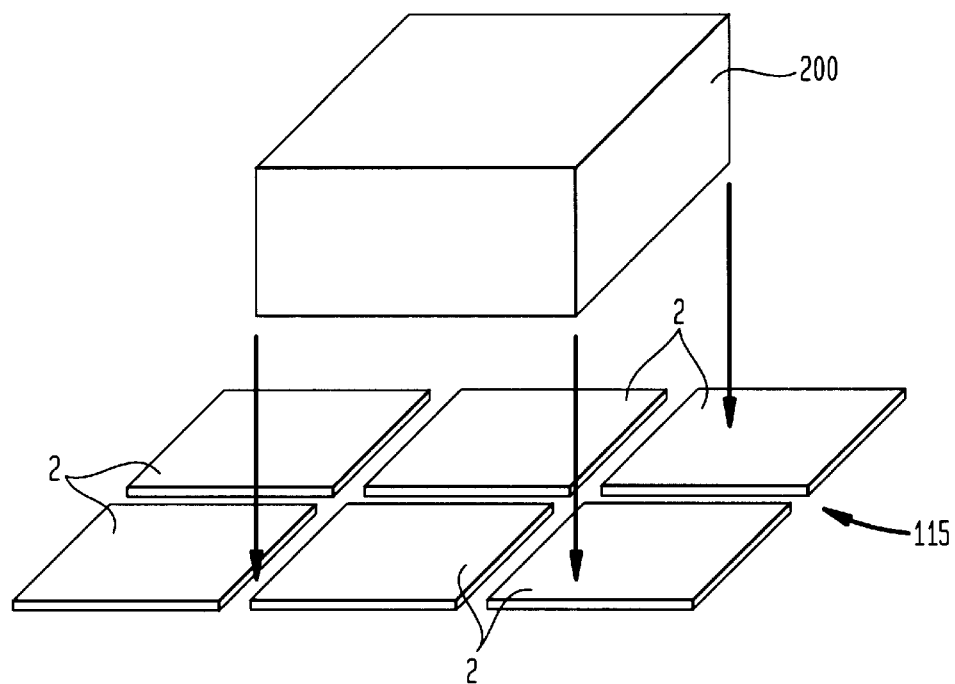
FIGS. 7a and 7b are schematic perspective illustrations of process steps for making another type of molded article according to the invention.
Figure 7B:
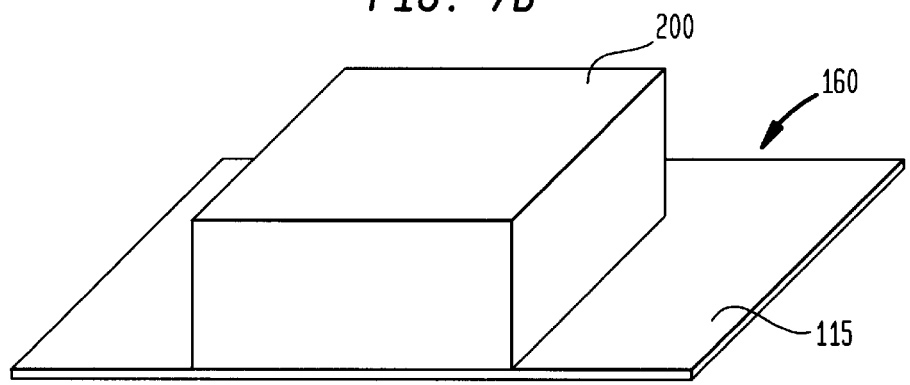

FIGS. 7*a* and 7*b* show process steps for making a further embodiment of a molded article in accordance with the invention. As shown in FIG. 7*a*, a bottom panel 115 is formed by placing preform plates 2 in one plane in a mosaic fashion. Set on the bottom panel 115 is a body 200 of any suitable material (FIG. 7*a*). Examples of materials for the body 200 include metal e.g. aluminum, copper, molybdenum, nickel-iron alloys or the like, or ceramics e.g. silicon carbide, aluminum nitride, aluminum oxide, boron nitride or the like.

Figure 7C:
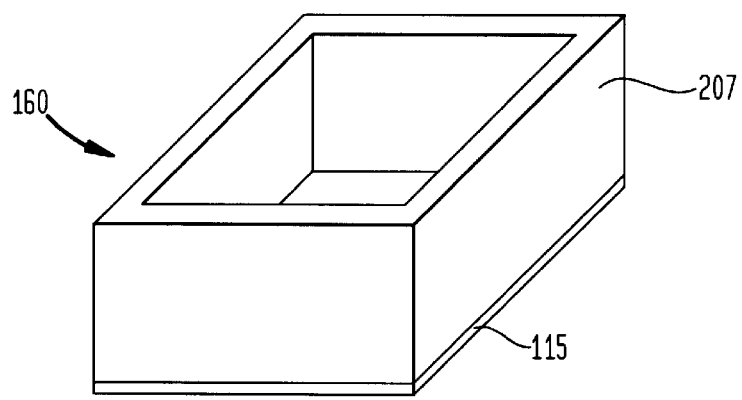
FIG. 7c is a schematic perspective illustration of a modification of the molded article of FIG. 7b.

Thereafter, the structure is subjected to infiltration with metal. As a result of infiltration, the bottom panel 115 and the body 200 are enclosed by infiltration metal and thus cast together to form a singular molded article, generally designated by reference numeral 160, as shown in FIG. 7*b*. FIG. 7*c* shows a perspective view of a modification of the molded article 160 in form of a frame 201.

Even though FIGS. 7*a* to 7*c* show the body 200 of cuboid configuration, it is to be understood that any other shape, e.g. cylindrical, pyramid-shaped or hollow cylindrical or the like, is possible for the body 200. Also, the bottom panel 115 may exhibit any suitable dimension, i.e. it may exceed the support surface of the body 200 or, as shown in FIG. 7*c* may be of same size as the support surface of the body 200. Moreover, the bottom panel 115 may be formed of several planes of preform plates 2.

In case the body 200 comprises passages 11 which should be clear of infiltration metal, suitable plugs 13 are inserted in a manner as described with reference to FIG. 3*c*. Also the incorporation of electrically insulated passages for forming electric connections is possible in a same manner as described in conjunction with FIGS. 5*a* to 5*c*.

The following description refers to a method of making a molded article of MMC in accordance with the present invention through infiltration of a preform 1 with a metal or a metal alloy.

The preform 1 is formed through spaced side-by-side placement of a plurality of preform plates 2. This placement of preform plates 2 results in molded articles of any shape and size. In the event the placement of adjoining preform plates 2 in one plane fails to create a molded article of desired dimensions, it is possible, in accordance with the present invention, to arrange several overlying planes at a spacing above one another. Additionally, a further body 200 may be placed onto the preform plates 2.

The preform plates 2 may however also be stacked in a tower-like fashion, with at least one further panel being disposed between the preform plates 2.

After placement of the preform plates 2 in the described manner, the structure is subjected to a casting process for infiltration of metal or metal alloy. The spacing 3, 4 between the preform plates 2 and between overlying planes of preform plates 2 may be filled with powder of ceramic material, preferably silicon carbide. This powder maintains the spacing between the preform plates 2, and moreover, reduces the difference of the thermal expansion between the spacing 3, 4 and the preform plates 2 when using aluminum as infiltration material.

In the event, the passages 11 should be clear of infiltration material, plugs 13 are inserted at suitable locations of the preform 1.

While the invention has been illustrated and described as embodied in a molded article of metal matrix composite, and method for making such an article, it is not intended to be limited to the details shown since various modifications and structural changes may be made without departing in any way from the spirit of the present invention.

What is claimed as new and desired to be protected by Letters Patent is set forth in the appended claims:

1. A molded article of metal matrix composite, comprising:

a preform comprised of a plurality of spaced preform plates stacked above one another in form of a tower;

a panel disposed between the preform plates, said preform plates being made of a first material and said panel being made of a second material differing from the first material of the preform plates; and an infiltration material made of a third material different from the first and second materials and selected from the group consisting of metal and metal alloy infiltrating the preform.

2. The molded article of claim 1 wherein the panel is made of a material selected from the group consisting of ceramic and metal.

3. The molded article of claim 2 wherein the ceramic is selected from the group consisting of aluminum oxide and aluminum nitride.

4. The molded article of claim 2 wherein the metal is selected from the group consisting of copper and aluminum.

5. The molded article of claim 1 wherein the infiltration material is selected from the group consisting of iron, nickel, cobalt, aluminum, copper, titanium, magnesium, silver, gold, silicon and alloys thereof.

6. The molded article of claim 1 wherein the preform plates are made of ceramic material.

7. The molded article of claim 6 wherein said ceramic material is selected from the group consisting of oxide, titanate, nitride, carbide, boride and mixtures thereof.

8. The molded article of claim 7 wherein said ceramic material is selected from the group consisting of aluminum oxide, aluminum nitride and silicon carbide.

9. The molded article of claim 1 wherein the preform plates are made of fiber material.

* * * * *